United States Patent [19]
Miner

[11] 3,881,208
[45] May 6, 1975

[54] CAR-WASH APPARATUS
[75] Inventor: Earl L. Miner, Long Lane, Mo.
[73] Assignee: Detroit Tool & Engineering Co., Lebanon, Mo.
[22] Filed: Feb. 11, 1974
[21] Appl. No.: 441,048

[52] U.S. Cl. ............................. 15/21 D; 15/DIG. 2
[51] Int. Cl. ............................................... B60s 3/06
[58] Field of Search ............ 15/DIG. 2, 21 D, 21 E, 15/53, 97

[56] References Cited
UNITED STATES PATENTS
3,570,034  3/1971  Lanfrankie.......................... 15/21 D
3,755,844  9/1973  Ennis.................................. 15/21 D
3,772,725  11/1973  Shelstad............................. 15/21 D

*Primary Examiner*—Edward L. Roberts

[57] ABSTRACT

Brush apparatus for car-wash installations employs a vertical, rotary brush mounted on a horizontally swingable arm. The brush is suspended from a carriage which is caused to move along the arm member, and means are provided for correlating carriage movement along its supporting arm with swinging movement of the arm, such that the brush is caused to travel in a substantially straight path, diagonally across the path of movement of the vehicle during the process of brushing the front or rear end surfaces of the vehicle.

10 Claims, 8 Drawing Figures

CAR-WASH APPARATUS

BACKGROUND AND SUMMARY OF THE INVENTION

The present invention relates to improvement in commercial vehicle washing apparatus, and particularly to improved brush apparatus for cleaning the external side and end surfaces of vehicles.

In certain commercial car-wash installations vertical rotary brushes mounted on swingable supporting arms are provided for cleaning the front, rear and side surfaces of a vehicle as it travels along a runway. In such installations the brush, impelled by the vehicle, is caused to move in an arcuate path across the path of the vehicle. The changing direction of brush movement in its arcuate path of movement tends to produce a variation in the rate of brush travel, and of brush pressure on the front or rear surfaces of the vehicle, as the brush moves across those surfaces. Such conditions result in a non-uniform cleaning job, excessive wear on the brushes, and irregular brush operation, particularly adjacent the corner areas of the vehicle.

The object of the present invention is to improve the effectiveness and efficiency of the vertical brushes in a vehicle washing installation. This is accomplished by improved mounting and operating means for the brushes that cause them to travel in more direct paths diagonally across the path of vehicle movement, and to enable the brushes to move smoothly, evenly and with uniformly moderate surface pressure as the brushes pass along and around the sides, ends and corner portions of the vehicle.

These and other objects and advantages of the invention will be further explained in the detailed description which follows.

DETAILED DESCRIPTION

Figure 1:
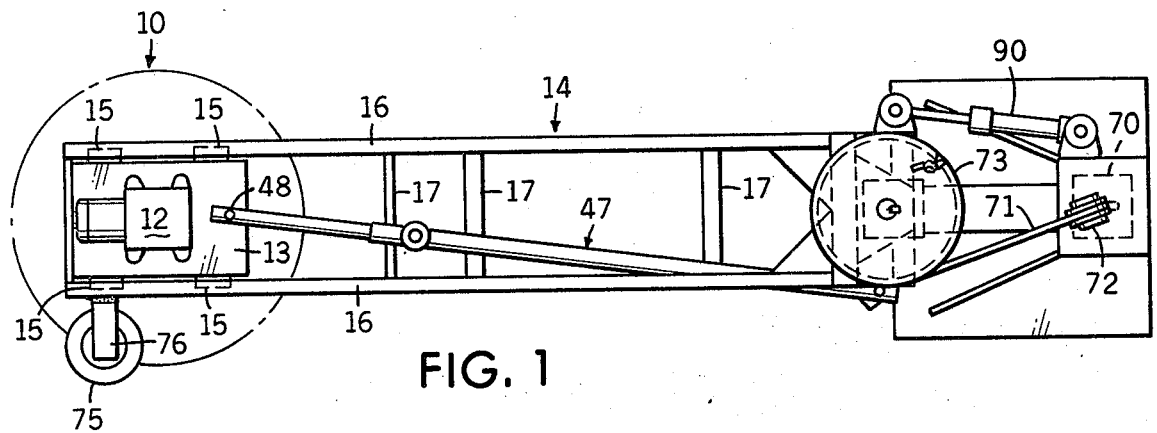
FIG. 1 of the drawings is a top plan view of a brush mounting assembly embodying the means of the present invention.

Referring now by numerals of reference to the drawings, 10 designates, generally, a vertical rotary brush of the type commonly employed in vehicle washing systems for scrubbing the side and end surfaces of vehicles. Brush 10 has a vertical shaft 11, and brushing or wiping elements, not specifically shown, attached to the shaft, preferably in the form of flexible plastic strips that hang limply from the shaft when the latter is stationary and which become centrifugally extended when power is applied to rotate the shaft. Power means for rotating the brush desirably consists of an electric or hydraulic motor, indicated at 12. The brush assembly is suspended from a carriage 13, which is mounted on a swingable arm structure 14 for travel longitudinally thereof. Carriage 13 is shown provided with wheels 15 which ride on the flanges of channeled side members 16 of the arm structure, these side members being interconnected by transverse tie members 17.

The motor unit 12 mounted on the top side of carriage 13 has a drive shaft 18 that extends vertically through the carriage body and through a bottom plate member 14. Shaft 18 is connected to one section of a universal joint 19 that interconnects the shaft 18 to the upper end of the brush shaft 11, the latter being journaled for rotation in a plate member 20 spaced below plate 14. The universal joint 19 permits brush 10 to swing laterally in all directions. Such swinging movement is opposed and limited by springs 21 which are compressed between the rockable lower plate 20 and the relatively fixed upper plate 14.

Figure 2:
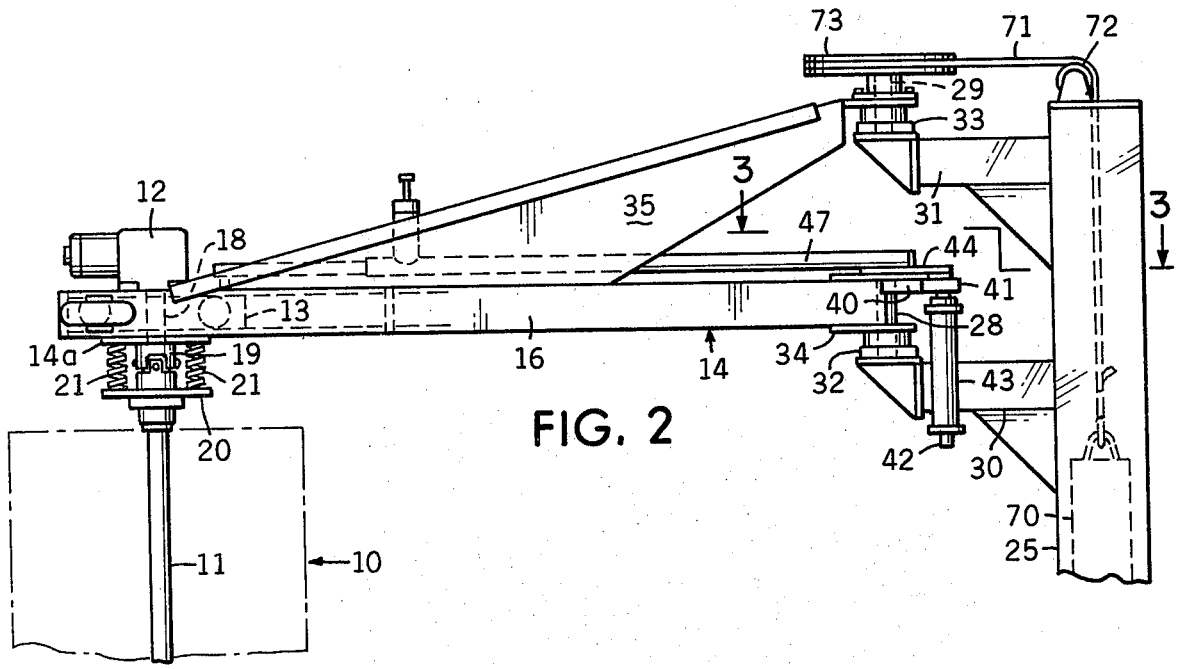
FIG. 2 is a side elevational view of the means illustrated in FIG. 1.
Figure 3:
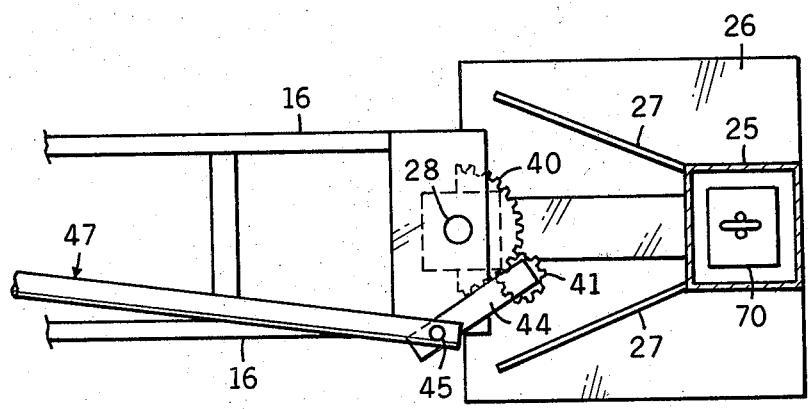
FIG. 3 is a sectional plan view taken at 3—3 of FIG. 1.

As best appears in FIG. 2 the arm structure 14 is pivotally mounted on a suitable support for horizontal swinging movement, in the present example comprising the hollow post or column 25, its base plate 26 and base gussets 27. The column 25 is shown to be provided near its upper end with a pair of vertical, coaxial, and spaced apart pivot pins 28, 29 that project upwardly from the free ends of individual brackets 30, 31 extending horizontally from the column 25 to which they are rigidly secured. The arm structure 14 has lower and upper bearing members 32 and 33 journaled on the pivot pins 28 and 29 respectively. The lower bearing 32 is mounted on a tie-plate 34 connecting the channel members 16 at their inner ends. The upper bearing 33 is secured to the inner end of a truss 35 (FIG. 2), that extends upwardly and inwardly from the channel members 16.

Means are provided for causing the carriage 13 and its brush assembly 10 to travel inwardly and outwardly along the arm 14 in coordination with swinging movement of the arm on the pivot pins 28 and 29. Such means, in the present example, comprises a gear-sector 40 fixed to the inner end of arm 14 with its center of rotation coaxial with pivot 28. Gear sector 40 meshes with a pinion gear 41 secured to the upper end of a shaft 42 which is journaled in a vertical bearing sleeve 43 secured as by welding to bracket 30. A crank member 44 secured to the upper face of pinion 41 has its outer or free end pivotally connected by a pin 45 to the inner end of a connecting rod assembly, generally indicated at 47. The opposite or outer end of the connecting rod is joined to a body part of carriage 13 by a pivot pin 48.

Figure 5:
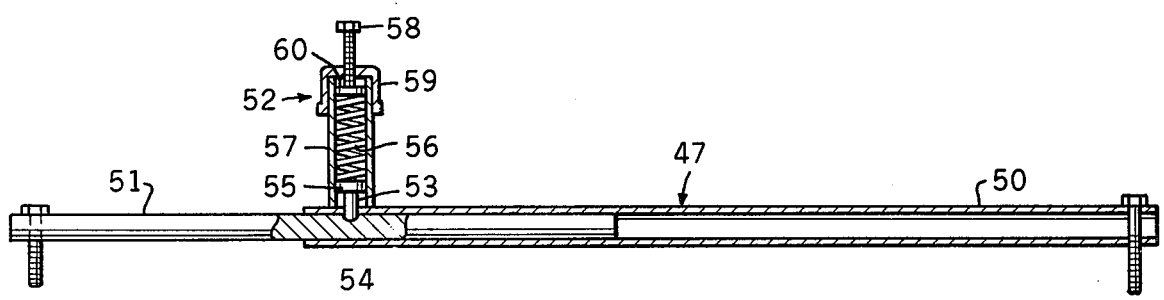
FIG. 5 is a partly sectioned side elevational view of a break-a-way safety linkage assembly.
Figure 6:
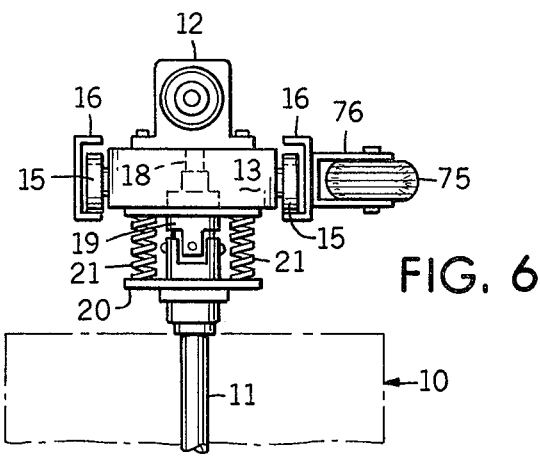
FIG. 6 is a fragmentary elevational view of brush suspension means.

As best appears in FIG. 5 the connecting rod assembly 47 in the present example is shown to consist of two principal parts, these being a tubular element 50 and a rod element 51 slidably disposed therein and projecting therefrom. The parts 50 and 51 are normally held together as a unit by a safety release device, generally at 52. The safety device 52 in the form illustrated essentially consists of a plunger pin 53 which projects through a wall opening in the tubular element 50 and, under normal conditions has its rounded extremity 54 seated in a depression in the rod element 51. The enlarged head 55 of the plunger pin is acted upon by a compression spring 56, both being confined within a casing 57 secured to the tubular element 50. The spring force acting on the plunger pin is adapted to be varied by an adjustment screw 58, threaded in the casing end cap 59 and acting, through a slide element 60, on the upper end of the spring.

Means are provided for applying a lateral force on the pivoted arm structure 14 in a direction to maintain the bristles or strands of brush 10 into proper active contact with side surfaces of the vehicle during a washing operation. Such means, in the present example, comprises a weight 70 connected to one end of a flexible cable 71 and suspended thereby within the support column 25. Cable 71 passes over a sheave 72 mounted atop column 25, then around the rim of a relatively large wheel 73, to which the bitter end of the cable is secured. Wheel 73 is fixedly secured to the truss 35 coaxially with the pivotal axis of the arm structure. In order to prevent contact of the hardware constituents of the described mechanism with a vehicle body and to limit the position of the brush to an optimum operating position relative thereto the arm is provided with a limit stop, in the form of a roller 75 which is journaled on a bracket 76 positioned on one side, near the outer end of the arm 14.

Figure 4:
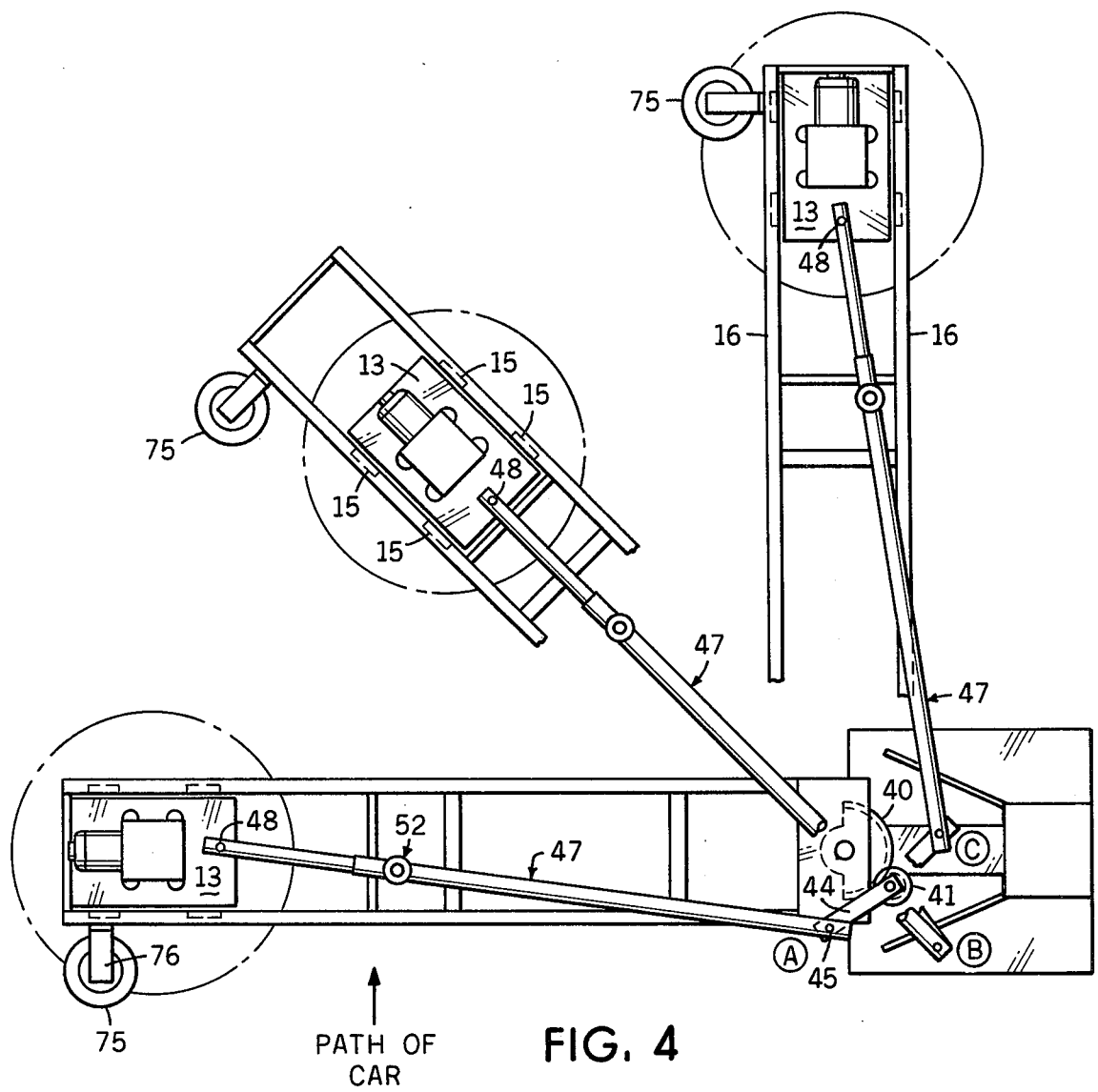
FIG. 4 is a plan view showing the brush support means in several angular positions.
Figure 7:
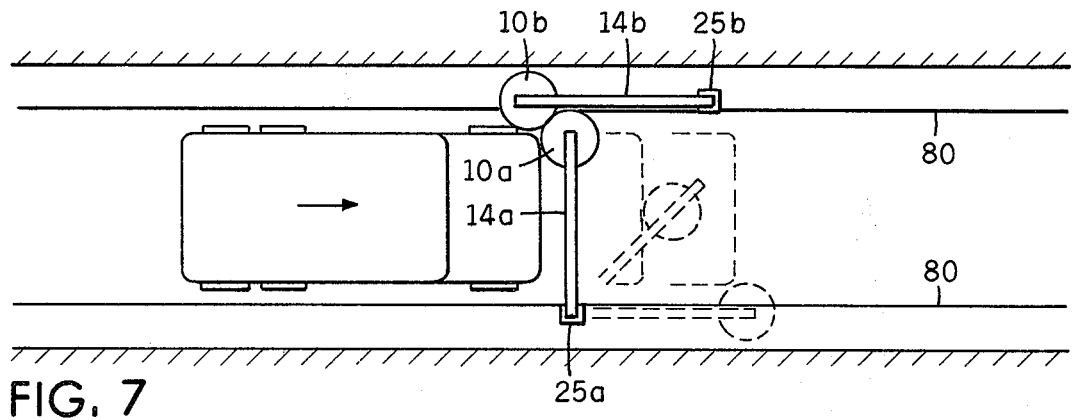
FIGS. 7 and 8 are diagrammatic plan views of a vehicle washing bay, showing the brushes in initial, intermediate and terminal positions during a washing operation.
Figure 8:
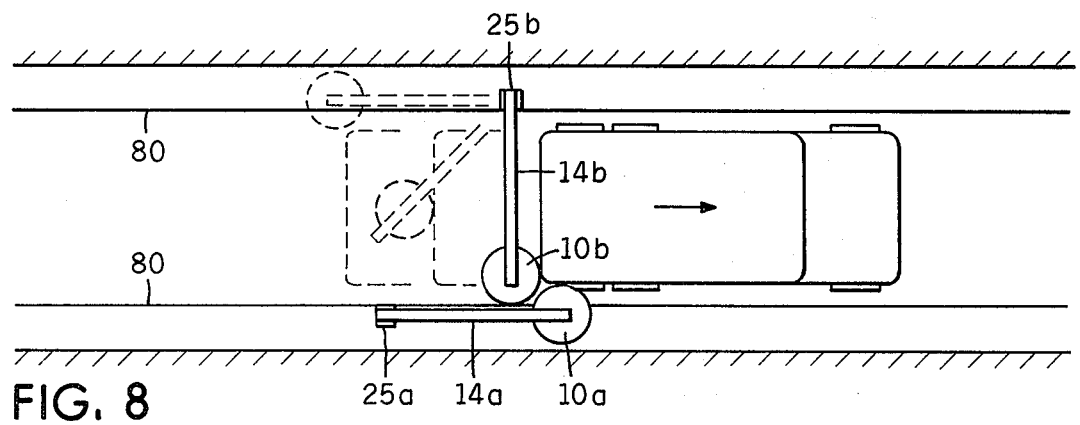

In a commercial car washing installation the brush units heretofore described are desirably employed in pairs, their mountings 25 being located on relatively opposite sides of a car runway, as defined by side rails or shoulders 80, in a washing bay, (FIGS. 7 and 8). The mountings 25 are also relatively spaced apart in the longitudinal direction of the runway. The arms 14 are desirably of length to reach across the runway to enable their brushes to be positioned at the side of a vehicle remote from the side near which the arms are mounted. FIG. 7 illustrates in full lines the position of the brushes 10a and 10b with respect to a vehicle at the beginning of a wash operation, and FIG. 8 represents, in full lines, the relative positions of those brushes with the same vehicle at the end of a washing operation. It will be seen that a brushing operation is started with both brushes at a front corner of the vehicle, (FIG. 7), and ends with the brushes at the diagonally opposite corner of the vehicle, (FIG. 8). At the start brush 10a is disposed near the outer extremity of its pivoted arm, 14a. As the vehicle advances along the runway its forward movement, together with the action of the rotating brush on the front end surfaces causes brush arm 14a to swing through an angle of approximately 90° while the brush 10a travels across the front end surfaces of the vehicle. During the course of the 90° arcuate movement of the supporting arm brush carriage 13 is drawn inwardly thereof in correlation with arm movement, until the 45° intermediate position is reached (see FIG. 4), and then is gradually pushed outwardly during the remaining 45° arc of arm movement to regain a position near the outer extremity of the arm. The initial, intermediate and ultimate positions of crank member 44 are indicated by letters A, B and C, respectively, in FIG. 4. The in and out movement of the carriage and brush is, of course, produced by the operating gear interconnecting the carriage and the arm 14, including gear-sector 40, pinion 41, crank 44, and the connecting rod or bar 47. If, for some untoward condition or reason the carriage is prevented from moving relative to the arm structure, the safety device 52 (FIG. 5) operates to disconnect its outer part 51 and thereby prevent damage to the described actuating parts.

By the means described, or equivalent means, the brush is caused to travel in a substantially straight path diagonally across the runway or direction of vehicle movement, instead of in an arcuate path as would normally be the case, absent the described means for rectifying the course of brush travel. Among the advantages realized by the described provisions are, the brush tends to travel at a substantially uniform rate in its movement across the front or rear end surfaces of the vehicle, assuming vehicle movement to be uniform. Brush pressure, and the brushing action thereof is likewise uniform, and brush life is extended. Also by reason of the described provision the tendency of the brush arms to stall, as the brushes approach the corners of the vehicle which they must round in passing from the end to side surfaces, is eliminated.

After a washing operation has been completed and the vehicle moves away from the brushing zone, brush arms 14 are caused to return from their ultimate positions shown in FIG. 8, to their initial positions shown in FIG. 7, in readiness for a subsequent washing operation. To that end the brush arms 14 are desirably provided with suitable power means, such as the pneumatic cylinder and piston assembly indicated generally at 90, FIG. 1. The piston, shown extended and pivotally connected to the arm structure 14 at a point laterally offset from the pivotal axis of that structure is caused to be retracted by a charge of compressed air delivered to the forward end of the cylinder. A sensing device, not shown, determines the presence or absence of a vehicle in the brushing zone of the wash bay and functions to actuate a valve to energize the pneumatic cylinder that restores the brushes to their initial locations following a washing operation. Such sensing devices are commonly used in car washing installations.

I claim as my invention:

1. In a vehicle washing system, brush apparatus including:
    a. a support,
    b. an arm pivoted to the support for horizontal swinging movement,
    c. a carriage mounted on said arm for movement relative thereto,
    d. a rotary brush means supported by said carriage, and
    e. means operatively interconnecting said carriage and said arm to move said carriage relative to said arm responsively to swinging movement of the arm.

2. In a vehicle washing system, the brush apparatus of claim 1, wherein:
    f. said carriage is mounted for rectilinear movement along said arm.

3. In a vehicle washing system, the brush apparatus of claim 1, wherein:
    f. said means operatively interconnecting said arm causes said carriage to reciprocate on said arm responsively to unidirectional arcuate movement of the arm.

4. In a vehicle washing system, the brush apparatus of claim 1, wherein:
    f. the carriage and brush carried thereby are caused, by said interconnecting means, to reciprocate relative to said arm, responsive to unidirectional arcuate movement of the arm whereby to flatten the arc of travel of said brush as compared to that of the outer end of said arm.

5. In a vehicle washing system, the brush apparatus of claim 4, wherein:

g. said carriage is mounted to reciprocate rectilinearly along said pivoted arm.

6. The brush apparatus of claim 5, wherein:

h. said rotary bursh is pivotally suspended from the carriage for lateral movement in all directions.

7. The brush apparatus of claim 6, including:

i. spring means acting on said brush and yieldably opposing lateral movement thereof relative to said carriage.

8. The brush apparatus of claim 1, including:

f. means applying a lateral force on said arm for yieldable resisting movement of the arm in one direction.

9. The brush apparatus of claim 8, including:

g. a second means for applying a lateral force on the arm in a direction opposite to that applied to the arm by the first said force means.

10. In a vehicle washing system, vehicle brushing apparatus including:

a. a runway, b. a fixed support at the side of said runway, c. an arm pivoted to said support for horizontal swinging movement between positions transversely of and parallel to the runway, d. a carriage mounted to reciprocate along said arm, e. a vertical rotary brush, f. a universal coupling mounting the brush dependingly from said carriage, g. spring means acting on said brush to resist lateral displacement thereof, h. means operatively connecting said carriage to said arm, whereby swinging movement of the arm is transmitted to move the carriage relative to the arm, and whereby the combined movements of arm and carriage convey the brush in a substantially straight, diagonal course across the runway.

* * * * *